United States Patent
Porat

(10) Patent No.: US 10,673,591 B2
(45) Date of Patent: *Jun. 2, 2020

(54) TRAVELING PILOTS WITHIN SINGLE USER, MULTIPLE USER, MULTIPLE ACCESS, AND/OR MIMO WIRELESS COMMUNICATIONS

(71) Applicant: Avago Technologies International Sales Pte. Limited, Singapore (SG)

(72) Inventor: Ron Porat, San Diego, CA (US)

(73) Assignee: Avago Technologies International Sale Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/546,714

(22) Filed: Aug. 21, 2019

(65) Prior Publication Data
US 2019/0379507 A1 Dec. 12, 2019

Related U.S. Application Data

(63) Continuation of application No. 14/865,425, filed on Sep. 25, 2015, now Pat. No. 10,396,957, which is a continuation of application No. 13/954,836, filed on Jul. 30, 2013, now abandoned, which is a
(Continued)

(51) Int. Cl.
*H04L 5/00* (2006.01)
*H04L 25/02* (2006.01)
*H04L 27/26* (2006.01)
*H04W 84/12* (2009.01)

(52) U.S. Cl.
CPC .......... *H04L 5/0051* (2013.01); *H04L 5/0026* (2013.01); *H04L 5/0048* (2013.01); *H04L 25/0204* (2013.01); *H04L 25/0232* (2013.01); *H04L 27/2613* (2013.01); *H04L 27/2666* (2013.01); *H04W 84/12* (2013.01)

(58) Field of Classification Search
CPC . H04W 84/12; H04L 25/0202; H04L 27/2665
USPC ...................................................... 375/260
See application file for complete search history.

(56) References Cited

U.S. PATENT DOCUMENTS

| | | |
|---|---|---|
| 8,149,934 B2 | 4/2012 | Kwak et al. |
| 8,340,234 B1 | 12/2012 | Cheng et al. |
| 8,385,438 B1 | 2/2013 | Cheng et al. |

(Continued)

*Primary Examiner* — Leila Malek
(74) *Attorney, Agent, or Firm* — Foley & Lardner LLP

(57) ABSTRACT

Pilot tones are included within symbols (e.g., orthogonal frequency division multiplexing (OFDM) symbols) transmitted between wireless communication devices. The pilot tones occupy fewer than all tone locations in any given symbol, and the pilot tones occupy different respective locations within different symbols. Generally, these traveling pilots are assigned to different respective tone locations in different symbols. In total, the pilot tones did not cover every single tone location within the symbols used to convey information between devices. Considering for example, when pilots occupy fewer than all tone locations, even among multiple symbols, a device may perform interpolation to generate a pilot tone estimate corresponding to a tone location not occupied by pilot tone within any symbol. Also, power or magnitude of the pilot tones themselves may be boosted or amplified relative to power magnitude of other tones within such symbols.

19 Claims, 10 Drawing Sheets

Related U.S. Application Data continuation-in-part of application No. 13/453,998, filed on Apr. 23, 2012, now abandoned.

(60) Provisional application No. 61/682,625, filed on Aug. 13, 2012, provisional application No. 61/699,151, filed on Sep. 10, 2012, provisional application No. 61/707,651, filed on Sep. 28, 2012, provisional application No. 61/716,269, filed on Oct. 19, 2012, provisional application No. 61/722,045, filed on Nov. 2, 2012, provisional application No. 61/842,573, filed on Jul. 3, 2013, provisional application No. 61/478,537, filed on Apr. 24, 2011, provisional application No. 61/493,577, filed on Jun. 6, 2011, provisional application No. 61/496,153, filed on Jun. 13, 2011, provisional application No. 61/501,239, filed on Jun. 26, 2011, provisional application No. 61/507,955, filed on Jul. 14, 2011, provisional application No. 61/512,363, filed on Jul. 27, 2011, provisional application No. 61/522,608, filed on Aug. 11, 2011, provisional application No. 61/542,602, filed on Oct. 3, 2011, provisional application No. 61/561,722, filed on Nov. 18, 2011, provisional application No. 61/577,597, filed on Dec. 19, 2011, provisional application No. 61/584,142, filed on Jan. 6, 2012, provisional application No. 61/592,514, filed on Jan. 30, 2012, provisional application No. 61/595,616, filed on Feb. 6, 2012, provisional application No. 61/602,504, filed on Feb. 23, 2012, provisional application No. 61/598,293, filed on Feb. 13, 2012.

(56) References Cited

U.S. PATENT DOCUMENTS

| | | |
|---|---|---|
| 8,649,450 B2 | 2/2014 | Hou-Shin et al. |
| 9,136,937 B1 | 9/2015 | Cheng et al. |
| 2003/0072255 A1 | 4/2003 | Ma et al. |
| 2004/0081074 A1 | 4/2004 | Piechocki |
| 2004/0081131 A1 | 4/2004 | Walton et al. |
| 2005/0030886 A1 | 2/2005 | Wu et al. |
| 2005/0094550 A1 | 5/2005 | Huh et al. |
| 2005/0099939 A1 | 5/2005 | Huh et al. |
| 2005/0114420 A1 | 5/2005 | Gibb et al. |
| 2005/0141626 A1 | 6/2005 | Lee et al. |
| 2005/0147025 A1 | 7/2005 | Auer |
| 2005/0163257 A1 | 7/2005 | Keerthi |
| 2005/0243938 A1 | 11/2005 | Armstrong et al. |
| 2006/0227857 A1 | 10/2006 | Gaal |
| 2006/0280114 A1 | 12/2006 | Osseiran et al. |
| 2006/0285599 A1 | 12/2006 | Seki et al. |
| 2007/0086329 A1 | 4/2007 | Glazko et al. |
| 2007/0121538 A1 | 5/2007 | Ode et al. |
| 2007/0140323 A1 | 6/2007 | Patel et al. |
| 2007/0211806 A1 | 9/2007 | Mudulodu et al. |
| 2007/0242761 A1 | 10/2007 | Yang |
| 2008/0039107 A1 | 2/2008 | Ma et al. |
| 2008/0247479 A1 | 10/2008 | Ma et al. |
| 2008/0279170 A1 | 11/2008 | Malladi et al. |
| 2009/0116374 A1 | 5/2009 | Henriksson et al. |
| 2009/0154625 A1 | 6/2009 | Kwak et al. |
| 2009/0190675 A1 | 7/2009 | Ling et al. |
| 2009/0196163 A1 | 8/2009 | Du |
| 2009/0207836 A1 | 8/2009 | Kawasaki et al. |
| 2009/0207954 A1 | 8/2009 | Dai et al. |
| 2009/0232234 A1 | 9/2009 | Du |
| 2009/0268710 A1 | 10/2009 | Yu et al. |
| 2010/0027698 A1 | 2/2010 | Kim et al. |
| 2010/0098042 A1 | 4/2010 | Dent |
| 2010/0157787 A1 | 6/2010 | Choi et al. |
| 2010/0172427 A1 | 7/2010 | Kleider et al. |
| 2010/0208834 A1 | 8/2010 | van Zelst et al. |
| 2010/0226453 A1 | 9/2010 | Wang et al. |
| 2010/0246515 A1 | 9/2010 | Tsai et al. |
| 2010/0247100 A1 | 9/2010 | Lin et al. |
| 2010/0310004 A1 | 12/2010 | Li et al. |
| 2010/0310016 A1 | 12/2010 | Okehie et al. |
| 2011/0002416 A1 | 1/2011 | Shin et al. |
| 2011/0002422 A1 | 1/2011 | Cheng et al. |
| 2011/0013729 A1* | 1/2011 | Yuba .................. H04L 27/2613 375/329 |
| 2011/0032953 A1 | 2/2011 | Lee et al. |
| 2011/0069790 A1 | 3/2011 | Okehie |
| 2011/0099216 A1 | 4/2011 | Sun et al. |
| 2011/0158342 A1 | 6/2011 | Srinivasan et al. |
| 2011/0164671 A1* | 7/2011 | Matsumura ......... H04L 27/2659 375/229 |
| 2012/0134440 A1 | 5/2012 | Yun et al. |
| 2012/0170684 A1 | 7/2012 | Yim et al. |
| 2012/0195391 A1* | 8/2012 | Zhang .................. H04L 5/0048 375/295 |
| 2012/0195397 A1 | 8/2012 | Sayana et al. |
| 2012/0236971 A1 | 9/2012 | Taghavi Nasrabadi et al. |
| 2012/0314636 A1 | 12/2012 | Liu |
| 2013/0121348 A1 | 5/2013 | Zhang et al. |
| 2013/0215993 A1* | 8/2013 | Taghavi Nasrabadi ..................... H04L 27/2615 375/295 |
| 2013/0230120 A1 | 9/2013 | Yang et al. |
| 2013/0235860 A1 | 9/2013 | Vermani et al. |
| 2013/0266086 A1 | 10/2013 | Yang et al. |

\* cited by examiner

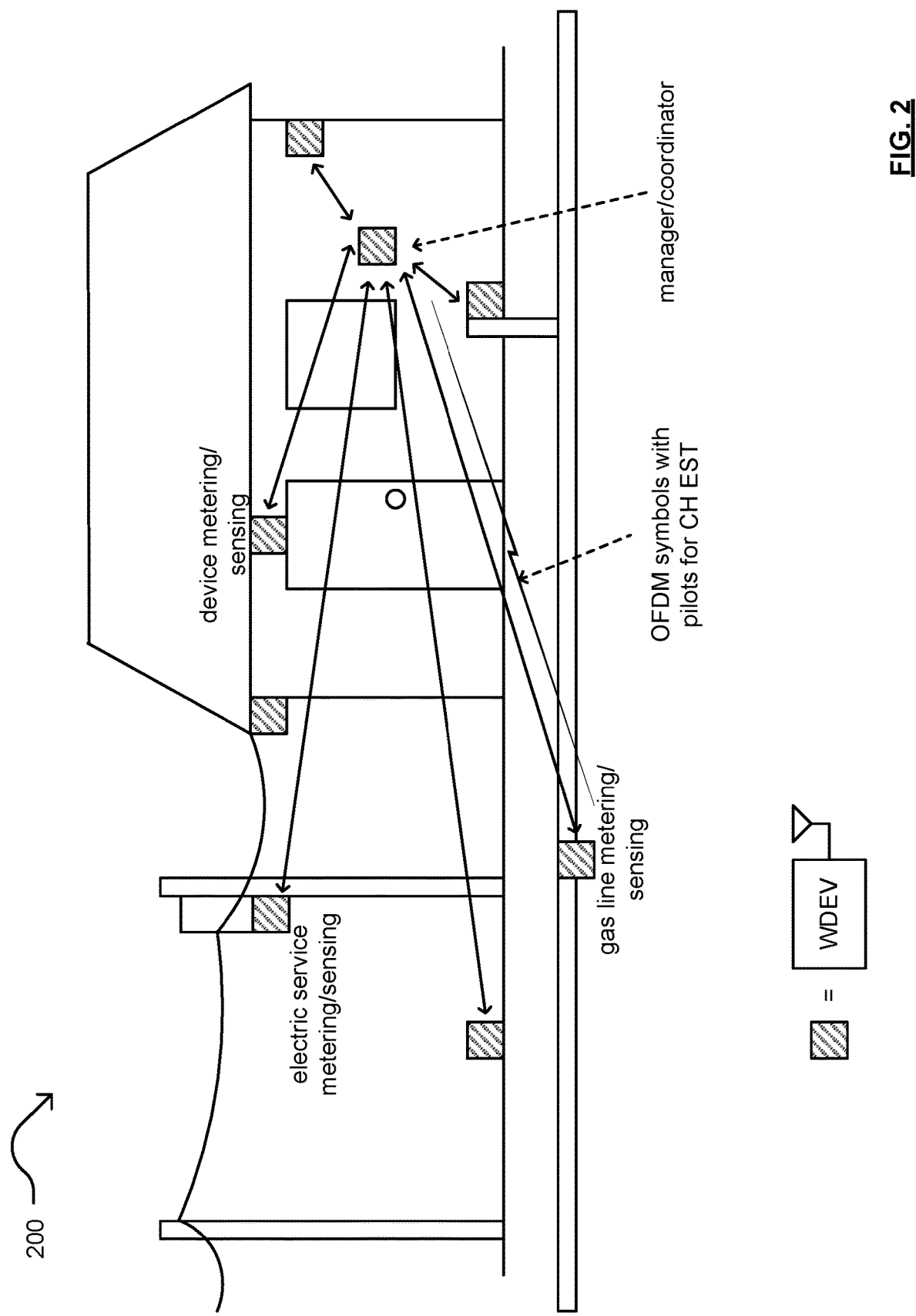

| | 32 FFT | 64 FFT | 128 FFT | 256 FFT | 512 FFT |
|---|---|---|---|---|---|
| # of pilots | 2 | 4 | 6 | 8 | 16 |
| # of occupied tones | 26 | 56 | 114 | 242 | 484 |
| # of symbols required to cover all tones/sub-carriers with pilots | 13 | 14 | 19 | 31 | 31 |

| | 32 FFT | 64 FFT | 128 FFT | 256 FFT | 512 FFT |
|---|---|---|---|---|---|
| # of pilots | 2 | 4 | 6 | 8 | 16 |
| # of occupied tones | 26 | 56 | 114 | 242 | 484 |
| # of symbols in each group | 4 | 4 | 5 | 8 | 8 |
| # of symbols required to cover all tones/sub-carriers with pilots | 16 | 16 | 20 | 32 | 32 |

|  | 32 FFT | 64 FFT | 128 FFT | 256 FFT | 512 FFT |
|---|---|---|---|---|---|
| # of pilots | 2 | 4 | 6 | 8 | 16 |
| # of occupied tones | 26 | 56 | 114 | 242 | 484 |
| minimum full periodicity with every tone occupied | 4 | 14 | 19 | 31 | 31 |
| full periodicity | 7 (odd tones) | 7 (even tones) | 10 (even tones) | 8 (Ng=4 feedback tones) | 8 (Ng=4 feedback tones) |

FIG. 9

TRAVELING PILOTS WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility Patent Application claims priority pursuant to 35 U.S.C. § 120 as a continuation of U.S. Utility application Ser. No. 14/865,425, entitled "Traveling pilots within single user, multiple user, multiple access, and/or MIMO wireless communications," filed Sep. 25, 2015, scheduled to issue as U.S. Pat. No. 10,396,957, on Aug. 27, 2019, which is a continuation of U.S. Utility application Ser. No. 13/954,836, entitled "Traveling pilots within single user, multiple user, multiple access, and/or MIMO wireless communications," filed Jul. 30, 2013, now abandoned, which claims priority pursuant to 35 U.S.C. § 119(e) to U.S. Provisional Application No. 61/682,625, entitled "Traveling pilots within single user, multiple user, multiple access, and/or MIMO wireless communications," filed Aug. 13, 2012, U.S. Provisional Application No. 61/699,151, entitled "Traveling pilots within single user, multiple user, multiple access, and/or MIMO wireless communications," Sep. 10, 2012, U.S. Provisional Application No. 61/707,651, entitled "Traveling pilots within single user, multiple user, multiple access, and/or MIMO wireless communications," filed Sep. 28, 2012, U.S. Provisional Application No. 61/716,269, entitled "Traveling pilots within single user, multiple user, multiple access, and/or MIMO wireless communications," filed Oct. 10, 2012, U.S. Provisional Application No. 61/722,045, entitled "Traveling pilots within single user, multiple user, multiple access, and/or MIMO wireless communications," filed Nov. 2, 2012, and U.S. Provisional Application No. 61/842,573, entitled "Traveling pilots within single user, multiple user, multiple access, and/or MIMO wireless communications," filed Jul. 3, 2013, all of which are hereby incorporated herein by reference in their entirety and made part of the present U.S. Utility Patent Application for all purposes.

U.S. Utility application Ser. No. 13/954,836 claims priority pursuant to 35 U.S.C. § 120 as a continuation-in-part of U.S. Utility application Ser. No. 13/453,998, entitled "Doppler adaptation using pilot patterns within single user, multiple user, multiple access, and/or MIMO wireless communications," filed Apr. 23, 2012, now abandoned, which claims priority pursuant to 35 U.S.C. § 119(e) to U.S. Provisional Application No. 61/478,537, entitled "Preamble for use within multiple user, multiple access, and/or MIMO wireless communications," filed Apr. 24, 2011, U.S. Provisional Application No. 61/493,577, entitled "Preamble for use within multiple user, multiple access, and/or MIMO wireless communications," filed Jun. 6, 2011, U.S. Provisional Application No. 61/496,153, entitled "Preamble for use within multiple user, multiple access, and/or MIMO wireless communications," filed Jun. 13, 2011, U.S. Provisional Application No. 61/501,239, entitled "Preamble for use within multiple user, multiple access, and/or MIMO wireless communications," filed Jun. 26, 2011, U.S. Provisional Application No. 61/507,955, entitled "Preamble for use within multiple user, multiple access, and/or MIMO wireless communications," filed Jul. 14, 2011, U.S. Provisional Application No. 61/512,363, entitled "Preamble for use within multiple user, multiple access, and/or MIMO wireless communications," filed Jul. 27, 2011, U.S. Provisional Application No. 61/522,608, entitled "Preamble for use within multiple user, multiple access, and/or MIMO wireless communications," filed Aug. 11, 2011, U.S. Provisional Application No. 61/542,602, entitled "Preamble for use within multiple user, multiple access, and/or MIMO wireless communications," filed Oct. 3, 2011, U.S. Provisional Application No. 61/561,722, entitled "Preamble for use within multiple user, multiple access, and/or MIMO wireless communications," filed Nov. 18, 2011, U.S. Provisional Application No. 61/577,597, entitled "Preamble for use within multiple user, multiple access, and/or MIMO wireless communications," filed Dec. 19, 2011, and U.S. Provisional Application No. 61/584,142, entitled "Preamble for use within multiple user, multiple access, and/or MIMO wireless communications," filed Jan. 6, 2012, U.S. Provisional Application No. 61/592,514, entitled "Preamble for use within multiple user, multiple access, and/or MIMO wireless communications," filed Jan. 30, 2012, U.S. Provisional Application No. 61/595,616, entitled "Preamble for use within multiple user, multiple access, and/or MIMO wireless communications," filed Feb. 6, 2012, U.S. Provisional Application No. 61/598,293, entitled "Preamble for use within multiple user, multiple access, and/or MIMO wireless communications," filed Feb. 13, 2012, and U.S. Provisional Application No. 61/602,504, entitled "Preamble for use within multiple user, multiple access, and/or MIMO wireless communications," filed Feb. 23, 2012, all of which are hereby incorporated herein by reference in their entirety and made part of the present U.S. Utility Patent Application for all purposes.

INCORPORATION BY REFERENCE

The following U.S. Utility Patent Applications are hereby incorporated herein by reference in their entirety and made part of the present U.S. Utility Patent Application for all purposes:

1. U.S. Utility application Ser. No. 13/453,703, entitled "Preamble for use within single user, multiple user, multiple access, and/or MIMO wireless communications," filed on Apr. 23, 2012, now U.S. Pat. No. 9,184,969 issued on Nov. 10, 2015.

2. U.S. Utility application Ser. No. 13/453,998, entitled "Doppler adaptation using pilot patterns within single user, multiple user, multiple access, and/or MIMO wireless communications," filed on Apr. 23, 2012, now abandoned.

3. U.S. Utility application Ser. No. 13/454,010, entitled "Long training field (LTF) for use within single user, multiple user, multiple access, and/or MIMO wireless communications," filed on Apr. 23, 2012, now U.S. Pat. No. 8,879,472 issued on Nov. 4, 2014.

4. U.S. Utility application Ser. No. 13/454,021, entitled "Short training field (STF) for use within single user, multiple user, multiple access, and/or MIMO wireless communications," filed on Apr. 23, 2012, now U.S. Pat. No. 9,113,490 issued on Aug. 18, 2015.

5. U.S. Utility application Ser. No. 13/454,033, entitled "Device coexistence within single user, multiple user, multiple access, and/or MIMO wireless communications," filed on Apr. 23, 2012, now U.S. Pat. No. 8,774,124 issued on Jul. 8, 2014.

BACKGROUND

Technical Field

The present disclosure relates generally to communication systems; and, more particularly, to channel estimation within wireless communication systems including those having long range and low rate wireless links.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into RF signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

Within such wireless communication systems, an accurate characterization of the wireless pathway between devices allows for greater performance. For example, a device that has a more precise information concerning a wireless pathway view which it will transmit a signal to another device can optimize various operational parameters for that transmission. As such, one or both of the devices involved in wireless communication will typically perform characterization of the wireless link between them.

BRIEF DESCRIPTION OF THE SEVERAL VIEWS OF THE DRAWINGS

FIG. 2 is a diagram illustrating an embodiment of a number of wireless communication devices, some operative as smart meter stations (SMSTAs).

FIG. 9 is a diagram illustrating a summary and comparison of various pilot structures.

DETAILED DESCRIPTION

Figure 1:
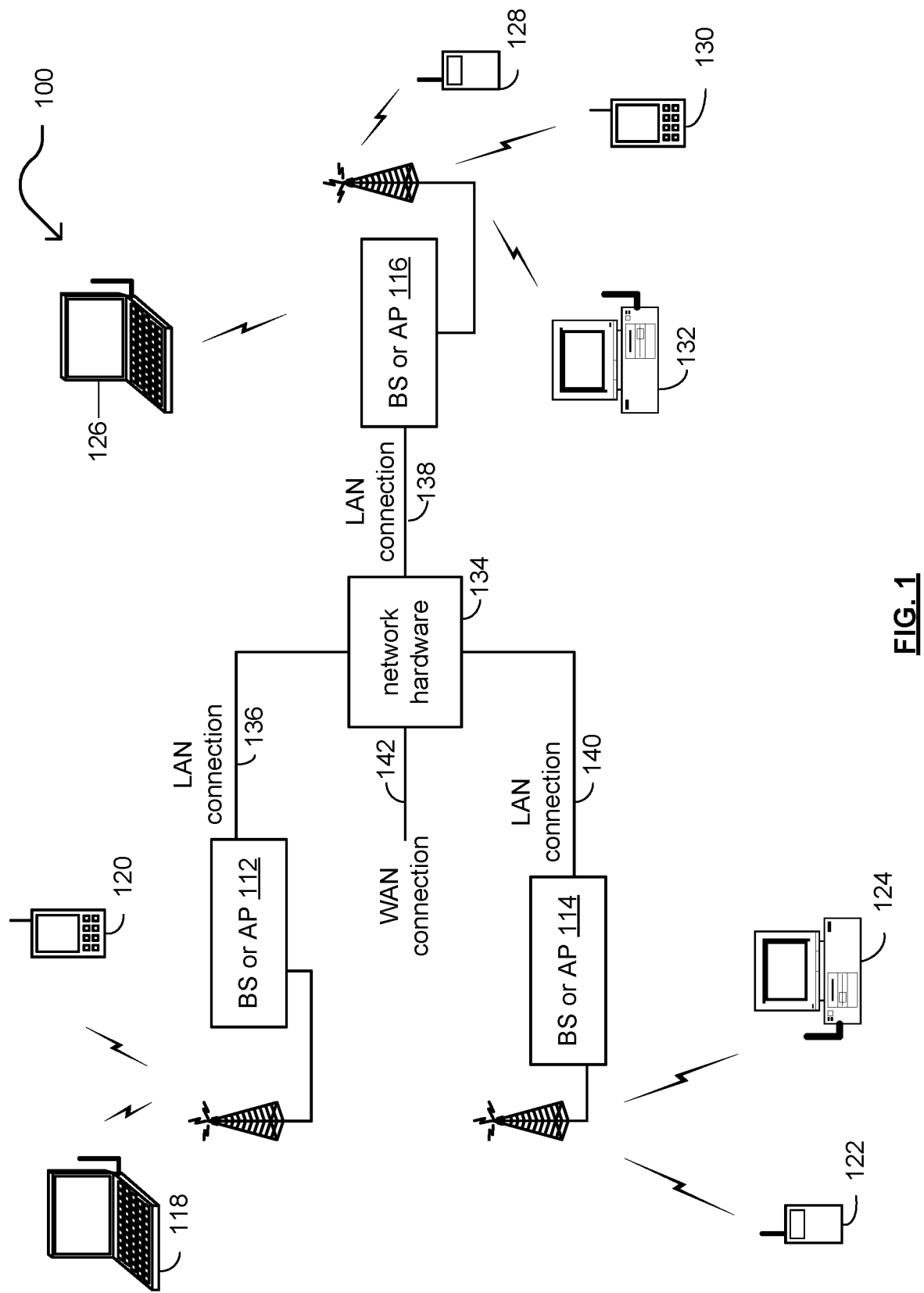
FIG. 1 is a diagram illustrating one or more embodiments of a wireless communication system.

FIG. 1 is a diagram illustrating one or more embodiments of a wireless communication system 100. The wireless communication system 100 includes base stations and/or access points 112-116, wireless communication devices 118-132 (e.g., devices that include wireless stations (STAs), stand-alone wireless stations, and/or smart meter stations (SMSTAs)), and a network hardware component 134. The wireless communication devices 118-132 may be laptop computers, or tablets, 118 and 126, personal digital assistant 120 and 130, personal computer 124 and 132 and/or cellular telephone 122 and 128. The details of an embodiment of such wireless communication devices are described in greater detail with reference to FIG. 2.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-114 to receive services from the communication system 100. For direct connections (i.e., point-to-point communications), wireless communication devices communicate directly via an allocated channel.

Any of the devices (e.g., wireless devices 118-132 or the various BSs or APs 112-116) can perform characterization of a wireless link between that device and another device with which it communicates. For example, any such device may receive a signal that includes symbols based on orthogonal frequency division multiplexing (OFDM). The device may utilize pilot tones included within certain of the symbols to perform channel estimation. Such symbols that include pilot tones may be transmitted in any of a number of ways including single-input-single-output (SISO), single-input-multiple-output (SIMO), multiple-input-single-output (MISO), multiple-input-multiple-output (MIMO), space time block coding (STBC), and/or other types of signaling.

Appropriately placed pilot tones allow for channel estimation to be performed on one spatial stream, two or more spatial streams (e.g., STBC), etc.

The values of these pilot tones are known or predetermined. When the symbols that include the pilot tones are transmitted from a source device to a recipient device, the recipient device compares the received values of the pilot tones with their initial/known or predetermined values to determine the effect that the wireless communication link has made on them (e.g., to characterize the transfer function of the wireless communication general). By this comparison, the recipient device may generate an estimate of the wireless communication link between the source and recipient devices (e.g., a channel estimate of that wireless communication channel).

When a signal includes pilot tones, those pilot tones occupied locations are not available for transmitting data. As such, pilot tones can generally be viewed as affecting the overall data throughput of signals transmitted between two devices. However, a device that generates an accurate channel estimate based on such pilot symbols can modify its operation to communicate more efficiently and to increase data throughput across that communication link. Pilot tones are a subset of the tones within OFDM symbols transmitted between devices (e.g., the pilot tones are not necessarily assigned to or do not necessarily cover all of the tones employed within such OFDM signaling).

As an example of operation, wireless device 118 receives symbols transmitted from BS or AP 112 (e.g., such symbols included within one or more frames, one or more signals, etc.). A first symbol includes pilot tones that are assigned to a first tone location subset, and a second symbol includes pilot tones that are assigned to a second tone location subset (e.g., different than the first tone location subset). These tone locations need not be contiguous or adjacent to one another; they may be spaced apart across the tones within any given symbol. Considering a number of symbols that include pilot tones in this manner, a significant number or even a majority of the tone locations are covered by pilots. The wireless device 118 compares the values of the received pilot tones within the symbols to their initial/predetermined or known values to generate an estimate of the wireless communication link between wireless device 118 and BS or AP 112. Different structures of pilots traveling among different tone locations within different symbols may be employed. In some instances, the locations of the pilots are based on a formula that is a function of the number of pilot tones and the number of symbols in which those pilot tones occur. In even other instances, the pilot tone location is based on the number of pilot tones, the number of symbols, and a number of symbol groups as described further below.

Generally, the pilots are approximately equally spaced among the tones within a given symbol. In a second symbol or within a second symbol group, the pilots can be assigned to tone locations that are offset relative to tone locations within a first symbol or first symbol group. Over a number of symbols or a number of symbol groups, a sufficient number of tones are occupied by pilots to allow the wireless device 118 to make an estimate of the wireless communication link between wireless device 118 and BS or AP 112.

FIG. 2 is a diagram illustrating an embodiment 200 of a number of wireless communication devices, some operative as smart meter stations (SMSTAs). The SMSTA are implemented in various locations in an environment including a building or structure. Some wireless communication devices may be implemented to support communications associated with monitoring and/or sensing of any of a variety of different conditions, parameters, etc. Such wireless communication devices provide such sensed/monitored information to one or more other wireless communication devices (e.g., from the SMSTAs to an AP).

A SMSTA has communication functionality similar to a wireless station (STA) and is also operative to perform communication of monitoring and/or sensing related information. In certain applications, such devices may operate only very rarely. For example, when compared to the periods of time in which such a device is in power savings mode (e.g., a sleep mode, a reduced functionality operational mode a lowered power operational mode, etc.), the operational periods of time may be miniscule in comparison (e.g., only a few percentage of the periods of time in which the device is in such a power savings mode).

An SMSTA may awaken from such a power savings mode only to perform certain operations. For example, such a device may awaken from such a power savings mode to perform sensing and/or measurement of one or more parameters, conditions, constraints, etc. During such an operational period (e.g., in which the device is not in a power savings mode), the device may transmit such information to another wireless communication device (e.g., an access point (AP), another SMSTA, a wireless station (STA), or such an SMSTA or STA operating as an AP, etc.).

In an SMSTA environment, multiple respective wireless communication devices (e.g., SMSTAs) can be implemented to forward monitoring and/or sensing related information to one particular wireless communication device that operates as a manager, coordinator, etc. such as may be implemented by an access point (AP) or a wireless station (STA) operating as an AP. Such SMSTAs may be implemented to perform any of a number of data forwarding, monitoring and/or sensing operations. For example, in the context of a building or structure, there may be a number of services that are provided to that building or structure, including natural gas service, electrical service, television service, Internet service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes. Communications from SMSTAs may be very important and yet performed quite infrequently.

Currently developing protocols/standards adapted for such metering applications are intended for long range and low rate applications operating in the worldwide spectrum below 1 GHz. The available spectrum in each country differs and requires flexible design to accommodate different options, and such long range and low rate applications are designed to accommodate longer delay spreads which can be associated with lower data rate applications.

Any of the various devices within such a metering application may perform channel estimation to characterize one or more wireless communication links via which it communicates with other devices. For example, considering the communication link between the gas line metering/sensing device and the manager/coordinator device, OFDM symbols that include pilots may be transmitted between the devices. The receiving device can use the pilots within one or more symbols received from the transmitting device to generate a channel estimate of the wireless communication channel between those devices. An accurate characterization of this wireless communication channel allows for more efficient communication to be made between the devices. Based on this accurate characterization, one or more operational parameters that govern such communications may be modified or adapted to increase efficiency, throughput, effectiveness, etc.

Figure 3A:
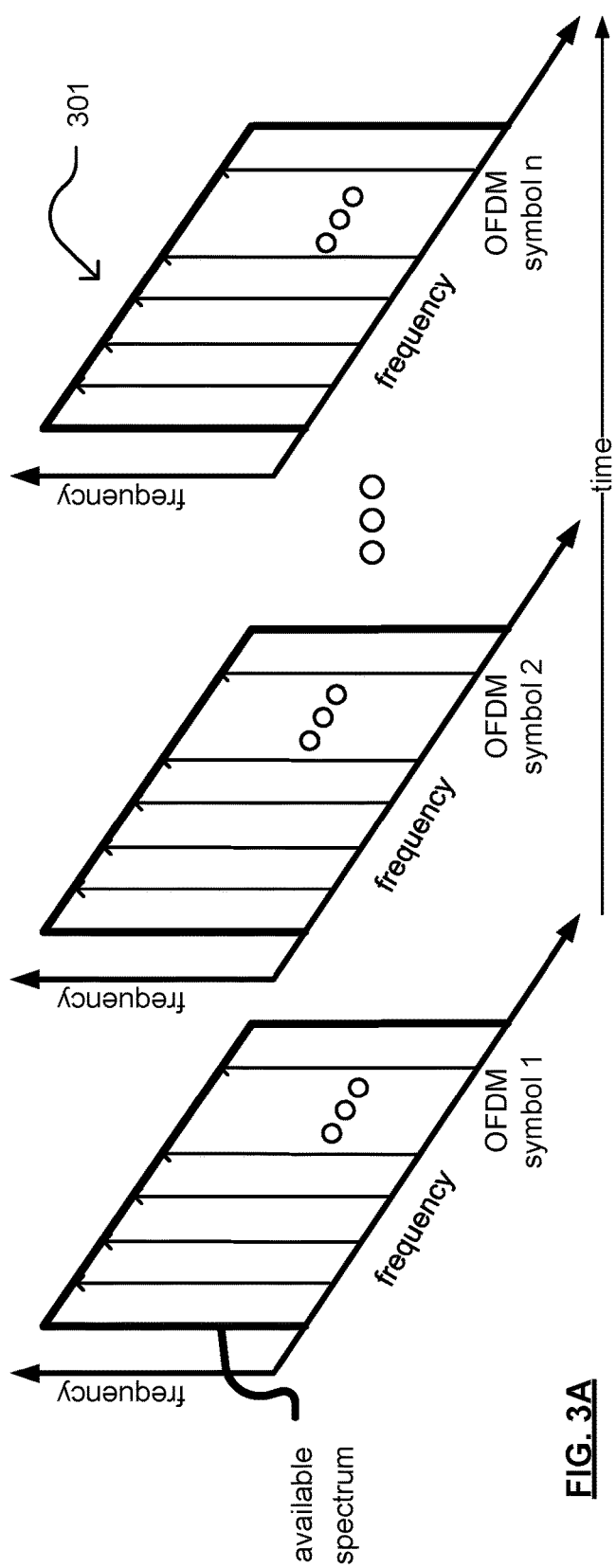
FIG. 3A is a diagram illustrating multiple symbols based on orthogonal frequency division multiplexing (OFDM) signaling.

FIG. 3A is a diagram illustrating multiple symbols 301 based on orthogonal frequency division multiplexing (OFDM) modulation. OFDM modulation may be viewed a dividing up an available frequency spectrum into a plurality of (narrowband) tones or sub-carriers (e.g., lower data rate tones or carriers). Typically, the frequency responses of these sub-carriers are overlapping and orthogonal. Each tone or sub-carrier may be modulated using any of a variety of modulation coding techniques.

OFDM modulation operates by performing simultaneous transmission of a larger number of (narrowband) tones or sub-carriers (or multi-tones). Oftentimes a guard interval (GI) or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols. Generally speaking, OFDM system design is based on the expected delay spread within the communication system (e.g., the expected delay spread of the communication channel).

Pilots can occupy a subset of the total number of tone locations within the various OFDM symbols. For example, a first group of pilot tones may be assigned to a first noncontiguous tone location subset in a first OFDM symbol, and a second group of pilot tones may be assigned to a second noncontiguous tone location subset in a second OFDM symbol. Generally, the pilot tones will be approximately evenly spaced at tone locations throughout a given OFDM symbol. The pilot locations can vary from symbol to symbol such that, over a series of symbols, all or a subset of all of the tone locations includes a pilot tone at least once. A given OFDM symbol includes a number of sub-carriers such that most of them include data while at least some of them include pilots (and they are spread throughout the sub-carriers such as among a number of noncontiguous sub-carriers)

Figure 3B:
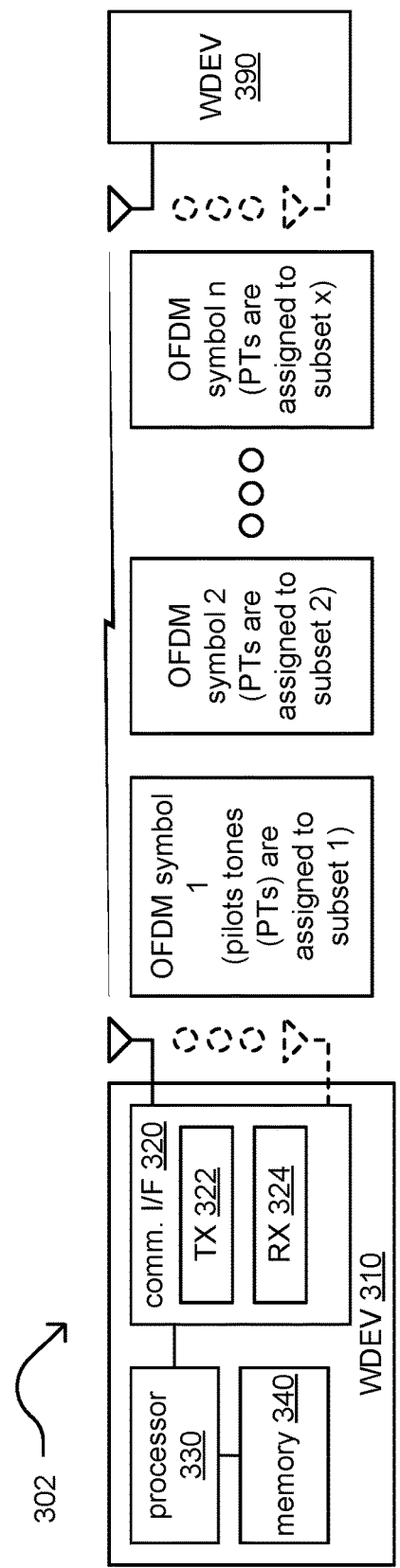
FIG. 3B is a diagram illustrating an example of communication between wireless communication devices.

FIG. 3B is a diagram illustrating an example 302 of communication between wireless communication devices. A wireless communication device 310 (e.g., which may be any one of devices 118-132 as with reference to FIG. 1) is in communication with another wireless communication device 390. The wireless communication device 310 includes a communication interface 320 to perform transmitting and receiving of one or more frames (e.g., using a transmitter 322 and a receiver 324). The wireless communication device 310 also includes a processor 330, and an associated memory 340, to execute various operations including interpreting one or more frames transmitted to wireless communication device 390 and/or received from the wireless communication device 390. As one of average skill in the art will appreciate, the wireless communication devices 310 and 390 of FIG. 3B may be implemented using one or more integrated circuits in accordance with any desired configuration or combination or components, modules, etc. within one or more integrated circuits.

Considering a number of OFDM symbols transmitted from device 392 device 310, communication interface 320 within device 310 first pilot tones are assigned to a first tone location subset in OFDM symbol 1, second pilot tones are assigned to a second tone location subset in OFDM symbol 2, and so on until a last group of pilot tones are assigned to an x-th tone location subset in OFDM symbol n. The different respective groups of pilot tones within the different respective symbols may be relatively offset with respect to each other. The second pilot tones are assigned to tone locations that are relatively offset respect to the tone locations covered by the first pilot tones. The processor 330 within device 310 is configured to process the pilot tones within the one or more received symbols to generate a channel estimate of the wireless communication channel between devices 390 and 310.

In some instances, the processor 330 also performs interpolation using two or more pilot tones to generate a pilot tone estimate of at least one tone location not occupied by a pilot. For example, a tone location that occurs between two tone locations occupied by pilots may be estimated by interpolating among those to pilot tone occupied locations. Also, the processor 330 can operate to generate one or more preliminary channel estimates based upon initially received symbols that include pilots, and the processor 330 can then update or finalize the one or more preliminary channel estimates based upon subsequently received symbols that include pilots. For example, given that any one symbol may include pilots that are assigned to fewer than all tone locations therein, an initial estimate of the channel may be less than fully accurate. As additional symbols are received by device 310, additional information provided from the pilots therein can be used to generate a final channel estimate of the wireless communication channel.

Figures 4A, 4B:
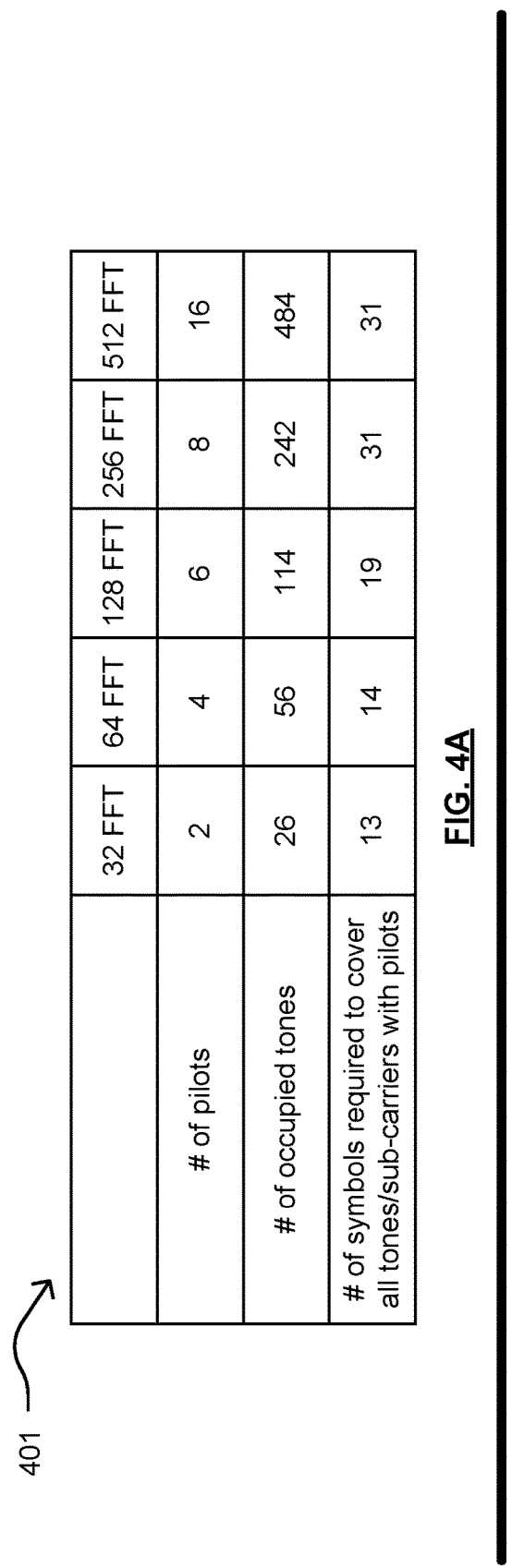
FIG. 4A is a diagram illustrating various examples of rotating pilot patterns for different fast Fourier transform (FFT) sizes.
FIG. 4B is a diagram illustrating various examples of rotating pilot patterns for different fast Fourier transform (FFT) sizes using decimation.

FIG. 4A is a diagram illustrating various examples 401 of rotating pilot patterns for different fast Fourier transform (FFT) sizes. There are a variety of different means by which pilot tone or sub-carrier locations may be selected within different respective symbols. For example, their locations may be selected based on one or more patterns, formulas, etc. Note that while certain exemplary embodiments in this disclosure employ a particular number of pilots (e.g., 4), such operation and functionality may be adapted and employed to any desired number of pilots.

Within certain prior versions of IEEE 802.11x (where x refers to the particular version, such as a, b, g, n, etc.), the pilot location is fixed throughout a packet such that the pilots occur only in known, specified locations. Within symbols of a given packet having at least one field, the pilot locations of those respective pilots are known, predetermined, fixed, etc. These pilot locations can be in the very same locations within different respective symbols.

In one or more embodiments, pilot placement may be such that pilot locations may be selected among different respective tones or sub-carriers within different respective symbols. For example, the respective pilot locations within different respective symbols may be different. In one example, such pilot placement within respective tones or sub-carriers is based upon at least one pattern or formula, which may have a periodicity covering a number of respective symbols (e.g., such that the pattern itself may be repeated after a particular number of symbols have been processed). In another example, the respective locations of tones or sub-carriers within different respective symbols may be adaptively or selectively determine in real time based upon any of a number of desired considerations (e.g., such as local and/or remote operating conditions or characteristics, mobility of a given communication device, and/or any other desired one or more considerations).

Generally speaking, the locations of pilots are rotated from tone to tone (e.g., or sub-carrier to sub-carrier) among different respective symbols such that their locations travel among the various symbols. In one example, all respective tones or sub-carriers are covered by at least one pilot over at least a certain number of symbols (e.g., such that the symbol pattern repeats). In another example, all respective data tones or sub-carriers are covered within a signal based on with such rotating or traveling pilots.

As may be seen in the table of FIG. 4A, a number of pilots, occupied tones, and the required rotation periodicity (e.g., the number of symbols required to cover all respective tones or sub-carriers with pilots) is shown for different respective fast Fourier transform (FFT) sizes. The number of occupied tones corresponds to those which may be employed for channel estimation, channel characterization, etc. For consideration of one example, rotating of 2 pilots over 32 FFT over 13 symbols will be assigned to all of the possible 26 tones or sub-carrier positions for data tones. Generally speaking, different respective symbols may have different numbers of tone or sub-carrier locations. As such, different numbers of symbols will be required to ensure pilots are assigned to all tone or sub-carrier locations within a given FFT size.

Generally speaking, a pilot rotation pattern may be selected to maintain a relatively large gap between pilot locations in each respective symbol to allow frequency offset tracking on a per symbol basis. For example, having a relatively large gap (e.g., as large as may be possible within a particular application) allows for appropriate frequency offset tracking in a more effective manner. However, note generally that any such desired pilot rotation pattern or formula may be employed, including those that do not necessarily have a relatively largest gap possible between pilots in respective symbols. For example, other patterns or formulas may be employed even if such pilot rotation patterns do not provide for a largest gap possible for use in performing frequency offset tracking.

FIG. 4B diagram illustrating various examples 402 of rotating pilot patterns for different fast Fourier transform (FFT) sizes using decimation. This table provides a summary of such an advanced pilot design employing rotation of pilots among respective tone or sub-carrier locations among different respective symbol groups. Considering an example that includes 4 groups of pilots, each respective group covers all of the tones or sub-carriers as a function of a certain 'modulo 4'. Generally, within an example that includes x (x being an integer) groups of pilots, each respective group covers all of the tones or sub-carriers as a function of a certain 'modulo x'. Note that any desired modulo factor may be alternatively employed. As the number of symbols in each group varies (e.g., from 4, to 5, to 8), the number of symbols required to cover all of the tone or sub-carrier locations will vary as well (e.g., from 16, to 20, to 32).

Figure 5:
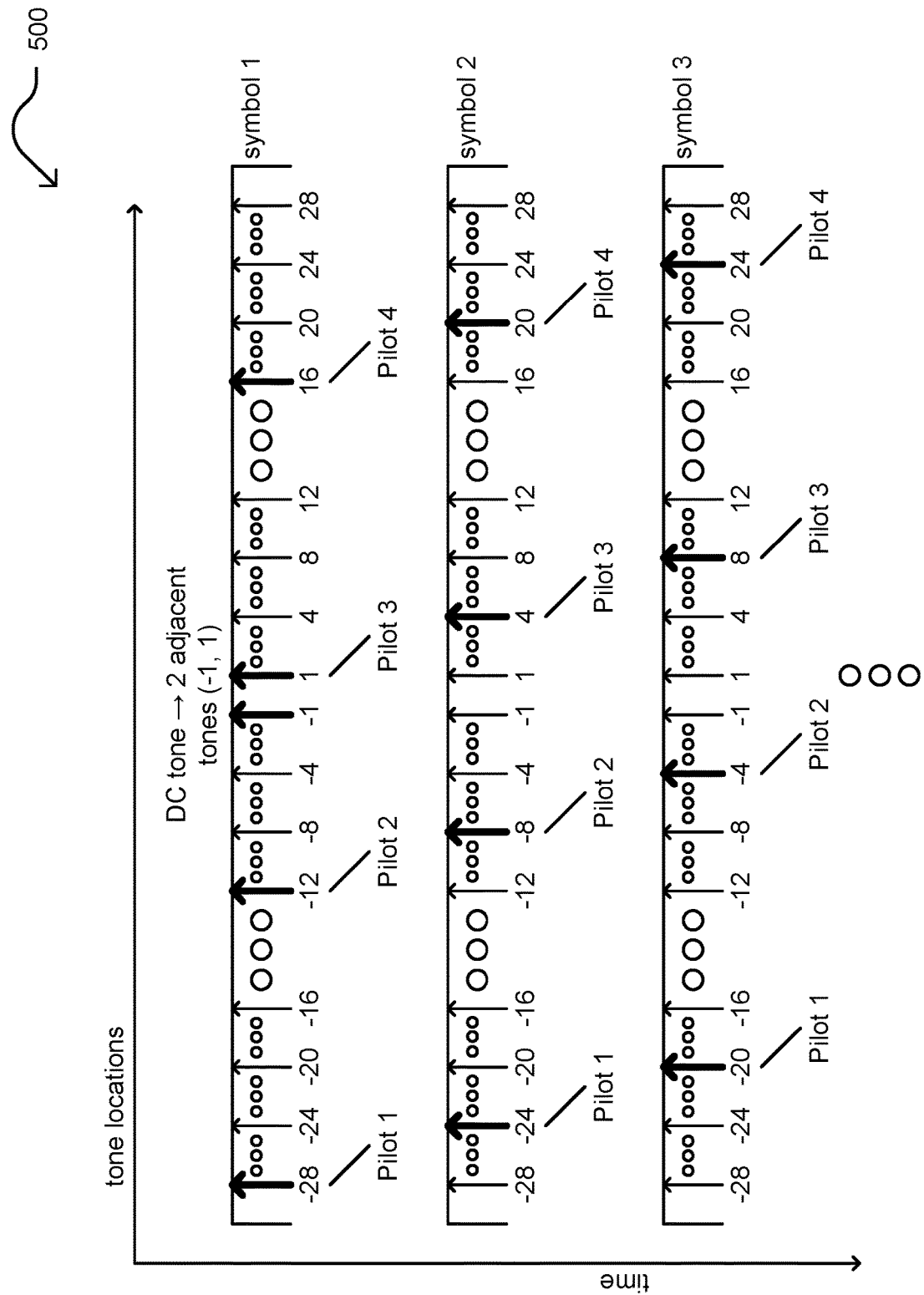
FIG. 5 is a diagram illustrating an example of decimated pilot rotation among different sub-carrier or tone locations within various symbols.

FIG. 5 is a diagram illustrating an example 500 of decimated pilot rotation among different sub-carrier or tone locations within various symbols. Traveling or rotated pilots are assigned to a decimated set of tones or sub-carriers within successive respective symbols. In this example, decimation is performed by a factor of 4, such that a pilot's tone or sub-carrier location within successive symbols is offset by a factor of 4 tones or sub-carriers. A receiver communication device can perform interpolation over the decimated set of tones or sub-carriers (which are not specifically covered by at least one pilot) in order to generate estimates of all respective tones or sub-carriers. By utilizing a decimated subset of tone locations of all of the tones or sub-carriers (e.g., noncontiguous, approximately evenly spaced throughout the symbol, etc.), channel estimate updating may be performed much faster. This can be particularly useful including implementations suffering from high Doppler effects.

Note that interpolation may be more optimally performed when there is equal (or substantially equal) spacing between the locations covered by the pilots. As such, in one example, each respective group of symbols will cover at least a uniformly decimated group of tones or sub-carriers. In one example, each group of 4 symbols will cover at least uniformly a decimated group of tones. Considering such an example, a first group may be as shown below for respective pilot spacing except where the DC tone is replaced by two adjacent tones as follows:

[(−28 −24 −20 −16) (−12 −8 −4 −1) (1 4 8 12) (16 20 24 28)]

This corresponds to 16 respective tone or sub-carrier locations split among 4 pilots over 4 symbols (pilots occupy locations (−28 −24 −20 −16) within a first symbol, pilots occupy locations (−12 −8 −4 −1) within a second symbol, etc.). Within a first symbol, a first pilot is located at −28, a second file is located of −12, a third pilot is located at 1, and a fourth pilot is located at 16. Within a second symbol, the first pilot is located at −24, the second pilot is located at −8, the third pilot is located at 4, and the fourth pilot is located at 20; and so on. If desired, such a subset of tone or sub-carrier locations may be used based on beamforming feedback (e.g., such as based on Ng=4 in IEEE 802.11ac) using uniformly spaced tones or sub-carriers.

Figure 6:
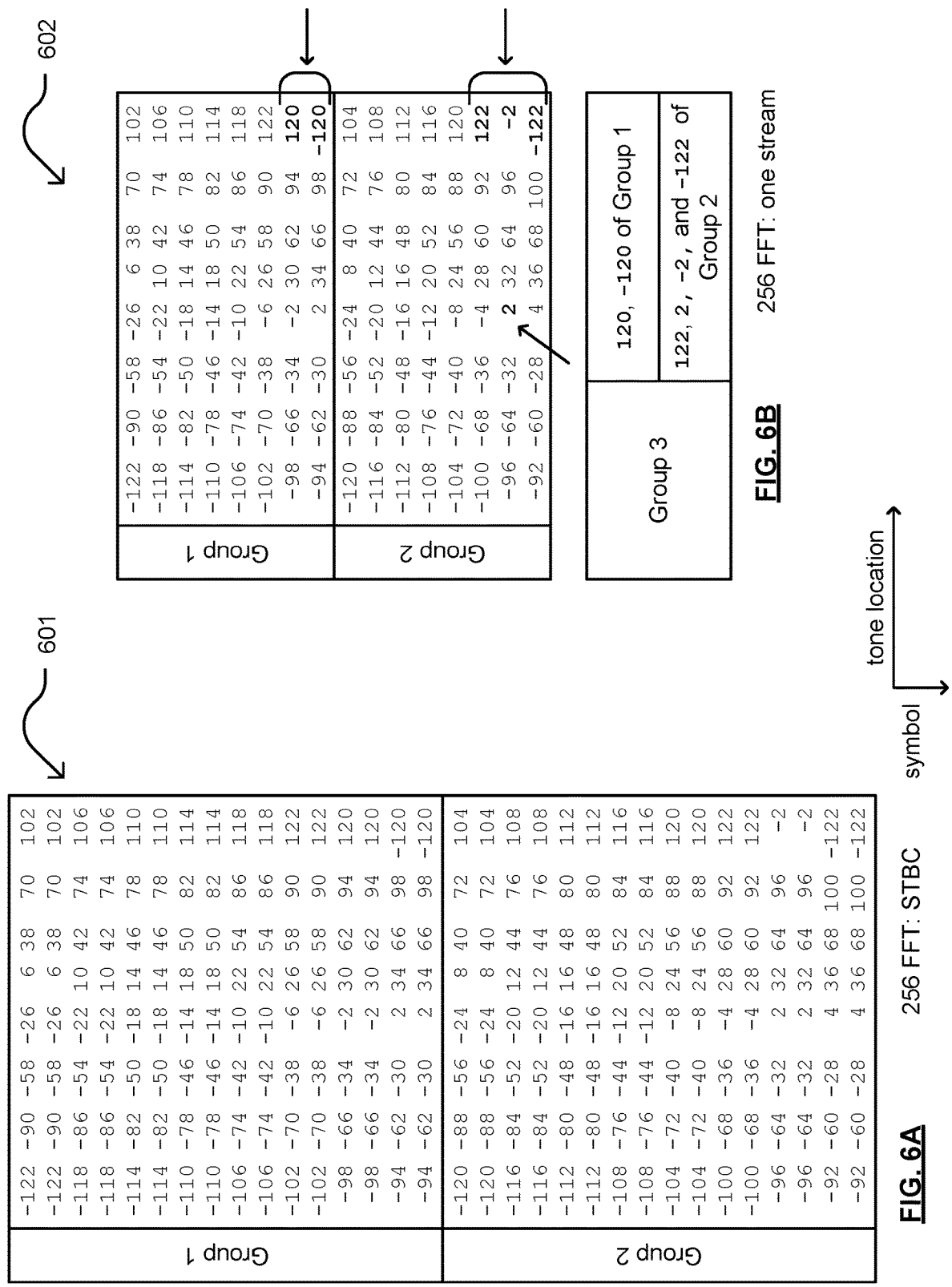
FIG. 6A is a diagram illustrating an example of tone allocation for 256 FFT based on space time block coding (STBC) signaling.
FIG. 6B is a diagram illustrating an example of tone allocation for 256 FFT for one stream.

FIG. 6A is a diagram illustrating an example 601 of tone allocation for 256 FFT based on space time block coding (STBC) signaling. For STBC signaling, pilot location of the first group is the tones −122:4:122 mapped to 8 locations×16 symbols in consecutive order. As shown in the diagram, pilots are assigned to a common tone location subset within two successive symbols. Note that, in each row, the pilot tone locations correspond to those tone locations shown, and the data tone locations correspond to those tone locations not specifically shown (e.g., in top row at left, tones −121:−91, −89:−59, −57:−27, −25:5, 7:37, 39:69, 71:101, and 103:122 are data tones and those tones specifically depicted are the pilot tones). As such, each of group 1 and group 2 includes 16 symbols.

FIG. 6B is a diagram illustrating an example 602 of tone allocation for 256 FFT for one stream. Pilot location of the first group is the tones −122:4:122 mapped to 8 locations×8 symbols in consecutive order, symbol first and then location, or equivalently using the formula:

−122+32 k+4 m where k=0:7 runs over pilots within a symbol and m=0:7 runs over symbols and where values for k=7, m=6 and k=7, m=7 are replaced by the values shown to remain within the allowed tone location range (two outer locations added).

Similarly for the second group locations −120:4:120 can use the formula:

−120+32 k+4 m with values for k=3, m=6 and k=7, m=5, 6, 7 are replaced by the values shown (0 was replaced by 2,−2 and two outermost locations added). Also, within a third group, with respect to one spatial stream, tone locations shown as 120, −120, 122, −122, and 2, −2 in groups 1 and 2 may replace formulaic determined values, and these locations are identified by arrows and bold face font in the diagram.

Figure 7:
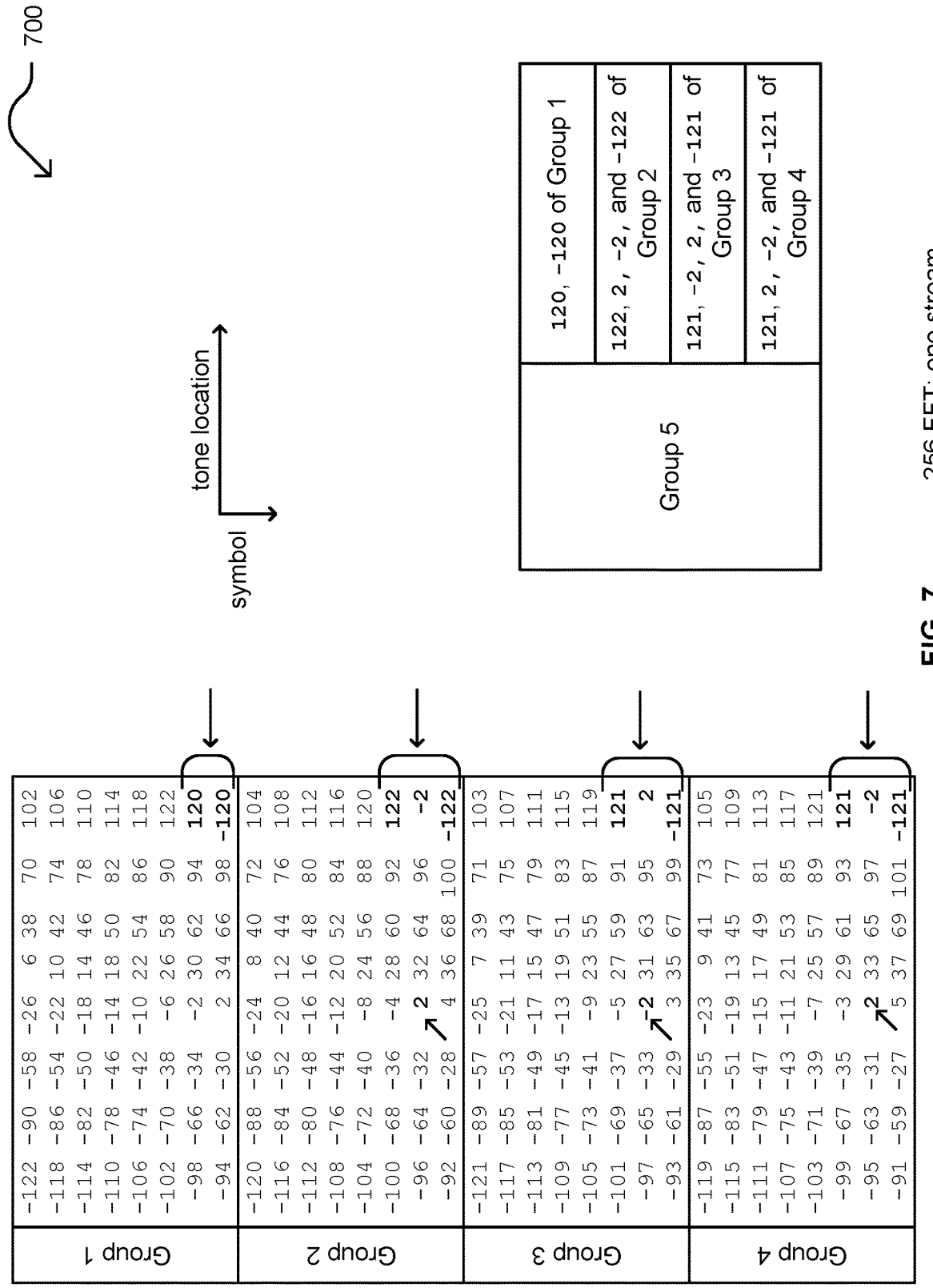
FIG. 7 is a diagram illustrating another example of tone allocation for 256 FFT for one stream.

FIG. 7 is a diagram illustrating another example 700 of tone allocation for 256 FFT for one stream. This alternative doesn't require interpolation at the expense of reduced gain from pilot averaging over symbols (e.g., pilots repeat twice less frequent), or more groups require few more options for FFT/IFFT interpolation.

With respect to pilot locations for the third and fourth groups, the pilot location of the third group is the tones −121:4:119 mapped to 8 locations×8 symbols in consecutive order−symbol first and then location, or equivalently using the formula:

−121+32 k+4 m where k=0:7 denotes pilot number within a symbol and m=0:7 runs over symbols and where values for k=3, m=6 and k=7, m=5, 6, 7 are replaced by the values shown (−1 is replaced by 2,−2 and two outermost locations added).

Similarly for the fourth group, locations −119:4:121 can use the following formula:

−119+32 k+4 m with values for k=3, m=6 and k=7, m=5, 6, 7 are replaced by the values shown (1 was replaced by 2,−2 and two outermost locations added). Also, within a fifth group, tone locations shown as 120, −120, 122, −122, 121, −121, and 2, −2 in groups 1, 2, 3, and 4 may replace formulaic determined values, and these locations are identified by arrows and bold face font in the diagram.

Figure 8:
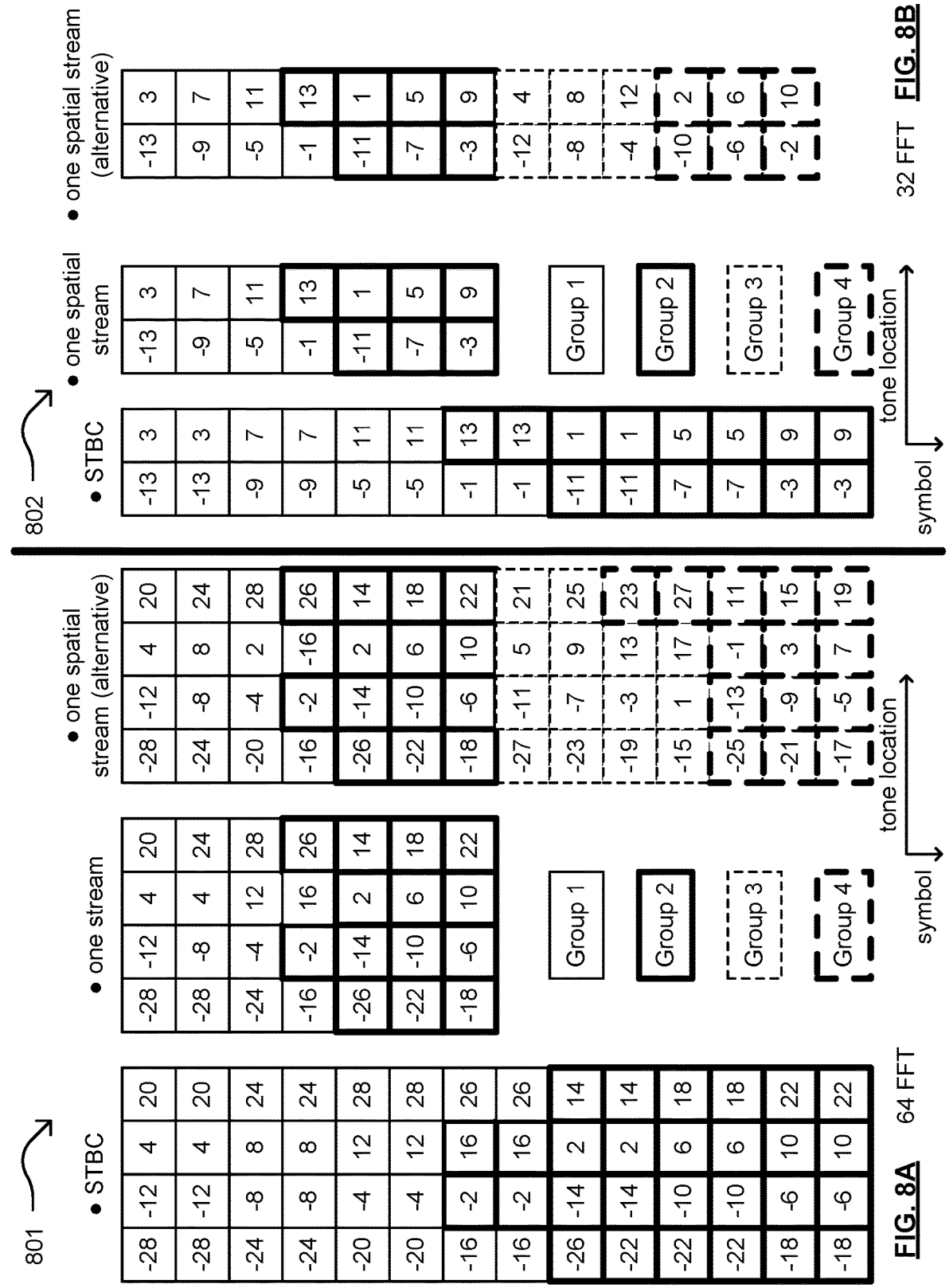
FIG. 8A is a diagram illustrating an example of tone allocation for 64 FFT for STBC signaling and also two different examples of one stream spatial stream.
FIG. 8B is a diagram illustrating an example of tone allocation for 32 FFT for STBC signaling and also two different examples of one stream spatial stream.

FIG. 8A is a diagram illustrating an example 801 of tone allocation for 64 FFT for STBC signaling and also two different examples of one stream spatial stream. Four separate groups are shown using bold faced and dashed line variants.

Pilot locations for the first group, tones −28:4:28 may be mapped to 4 locations×4 symbols in consecutive order, or equivalently using the following formula:

−28+16 k+4 m where k=0:3 denotes pilot number within a symbol and m=0:3 runs over symbols and where values for k=1, m=3 and k=3, m=3 are replaced by the values shown from the second group.

Similarly for the other group locations, third and fourth groups (e.g., 26:4:22,−27:4:25, −25:4:27) are mapped in the order and as depicted in the diagram.

FIG. 8B is a diagram illustrating an example 802 of tone allocation for 32 FFT for STBC signaling and also two different examples of one stream spatial stream. The pilot location mapping is made with respect to four different groups as shown in the diagram. The pilot locations are as shown for 32 FFT and follows analogous, similar mapping rules as described above.

FIG. 9 is a diagram illustrating a summary and comparison of various pilot structures 900. In one example, a pilot design is employed where pilots are split into 4 groups spanning decimated sets of tones. Several different examples have been presented in this disclosure for different respective FFT sizes. Different examples use 32 FFT/64 FFT and 128 FFT and 256 FFT in order to enable improved channel estimation performance and provide relatively higher Doppler immunity with similar performance over different FFT sizes. Alternatively, other options can be used for the 2 or 3 lower FFT sizes, certain options may be used for 128FFT and 256FFT to keep the same full periodicity. In some instances, boosting pilot power or magnitude is performed to improve channel estimation and phase tracking.

Also, note that some implementations that operate using more than one spatial stream will not necessarily be assigned to all tones. In such implementations, a receiver can perform interpolation in implementations in which not all of the tones are covered.

Also, in this instance, the matrix P shown below may be used to mix all the spatial streams together when one or more long training fields (LTFs) are used to estimate the channel per spatial stream. This can reduce processing delay. Also, unlike LTF, pilots are spread across many symbols and the receiver communication device complexity may in fact increase by storing all those pilots.

The formula used to modulate the pilots corresponding to each spatial stream may then be similar to the formula in IEEE 11ac (shown below) for LTF as applied to multiple streams, but without specifically using matrix P (shown below).

$$[LTF1_k, LTF2_k, \ldots, LTFN_{LTF\_k}]_{N_{TX} \times N_{LTF}} = Q_k D_{CSD}^{(k)} P_{N_{STS} \times N_{LTF}} s_k$$

$$P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}_{N_{TX} \times N_{LTF}}$$

$s_k$: LTF pilot sign in tone $k$, being either +1 or −1.

Figure 10B:
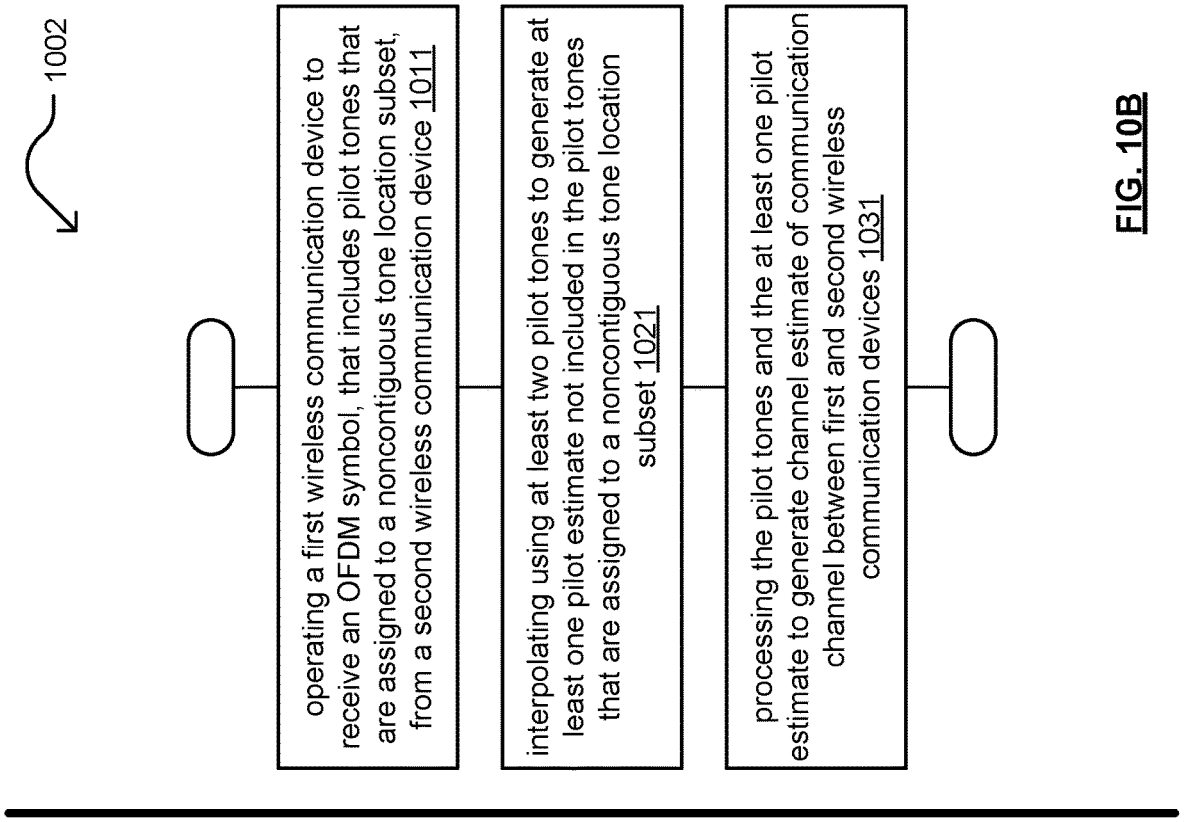
FIG. 10B is a diagram illustrating another embodiment of a method for execution by one or more wireless communication devices.
Figure 10A:
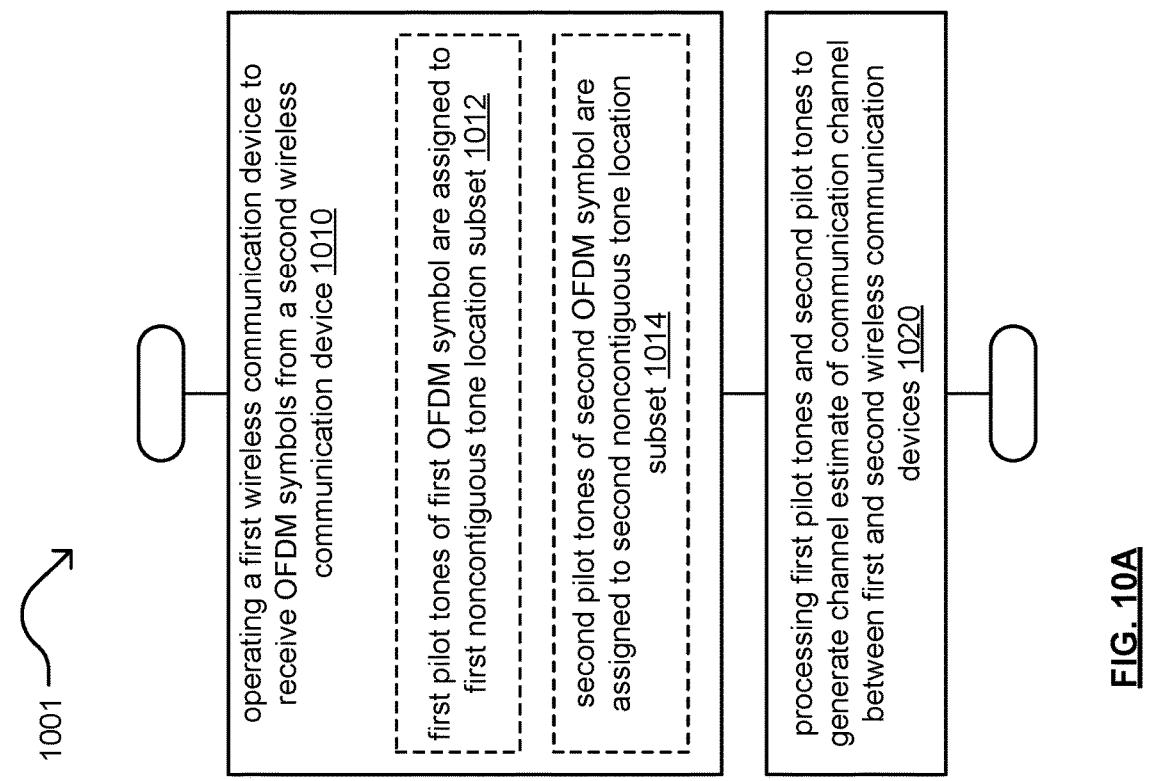
FIG. 10A is a diagram illustrating an embodiment of a method for execution by one or more wireless communication devices.

FIG. 10A is a diagram illustrating an embodiment of a method 1001 for execution by one or more wireless communication devices. Method 1001 begins by operating a first wireless communication device to receive OFDM symbols from a second wireless communication device, as shown in a block 1010. Within the OFDM symbols, first pilot tones of a first OFDM symbol are assigned to a first noncontiguous tone location subset (block 1012), and second pilot tones of a second OFDM symbol are assigned to a second noncontiguous tone location subset (block 1014).

The method 1001 then operates by processing first pilot tones and second pilot tones to generate channel estimate of communication channel between first and second wireless communication devices, as shown in a block 1020.

FIG. 10B is a diagram illustrating another embodiment of a method 1002 for execution by one or more wireless communication devices. Method 1002 begins by operating a first wireless communication device to receive an OFDM symbol, which includes pilot tones that are assigned to a noncontiguous tone location subset, from a second wireless communication device, as shown in a block 1011.

The method 1002 continues by interpolating using at least two pilot tones to generate at least one pilot estimate not included in the pilot tones that are assigned to a noncontiguous tone location subset, as shown in a block 1021. The method 1002 then operates by processing the pilot tones and the at least one pilot estimate to generate channel estimate of communication channel between first and second wireless communication devices, as shown in a block 1031.

It is noted that the various operations and functions described within various methods herein may be performed within a wireless communication device (e.g., such as by the processor 330 and communication interface 320 as described with reference to FIG. 3 and/or other components therein). Generally, a communication interface and processor in a wireless communication device can perform such operations.

Examples of some components may include one of more baseband processing modules, one or more media access control (MAC) layers, one or more physical layers (PHYs), and/or other components, etc. For example, such a baseband processing module (sometimes in conjunction with a radio, analog front end (AFE), etc.) can generate such signals, frames, etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

The present invention has been described herein with reference to at least one embodiment. Such embodiment(s) of the present invention have been described with the aid of structural components illustrating physical and/or logical components and with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims that follow. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may also be used herein, the terms "processing module," "processing circuit," "processing circuitry," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a functional block, hardware, and/or software stored on memory for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry is configured to:
select a fast Fourier transform (FFT) structure from a plurality of FFT structures;
generate a plurality of orthogonal frequency division multiplexing (OFDM) symbols that includes data and pilots modulated on an occupied subset of a plurality of sub-carriers associated with the FFT structure; and
transmit the plurality of OFDM symbols to another wireless communication device to be used by the another wireless communication device to perform channel estimation of a wireless communication channel between the wireless communication device and the another wireless communication device wherein the FFT structure is selected from:
a first FFT structure of the plurality of FFT structures specifies a first number of sub-carriers, a first occupied subset of sub-carriers within the first number of sub-carriers for the first FFT structure, and a first pilot periodicity of a first number of symbols associated with a first pilot pattern of the first FFT structure;
a second FFT structure, larger than the first FFT structure, of the plurality of FFT structures, specifies a second number of the sub-carriers that is different than the first number of sub-carriers, a second occupied subset of sub-carriers within the second number of the sub-carriers for the second FFT structure, and a second pilot periodicity of a second number of symbols associated with a second pilot pattern for the respective FFT; and
a third FFT structure, larger than the second FFT structure, of the plurality of FFT structures, specifies a same pilot periodicity of a number of symbols as the second FFT structure.

2. The wireless communication device of claim 1, the at least one of the communication interface or the processing circuitry is further configured to:
select the FFT structure from the plurality of FFT structures during a first time period;
generate the plurality of OFDM symbols that includes the data and the pilots modulated on the occupied subset of the plurality of sub-carriers associated with the FFT structure during the first time period;
transmit the plurality of OFDM symbols to the another wireless communication device to be used by the another wireless communication device to perform channel estimation of the wireless communication channel between the wireless communication device and the another wireless communication device during the first time period;
select another FFT structure from the plurality of FFT structures during a second time period;
generate another plurality of OFDM symbols that includes other data and other pilots modulated on another occupied subset of another plurality of sub-carriers associated with the another FFT structure during the second time period; and
transmit the another plurality of OFDM symbols to at least one other wireless communication device to be used by the at least one other wireless communication device to perform channel estimation of at least one wireless communication channel between the wireless communication device and the at least one other wireless communication device during the second time period.

3. The wireless communication device of claim 1, the at least one of the communication interface or the processing circuitry is further configured to:
generate the plurality of OFDM symbols based on space time block coding (STBC).

4. The wireless communication device of claim 1 further comprising:
a wireless station (STA), wherein the another wireless communication device includes an access point (AP).

5. The wireless communication device of claim 1 further comprising:
an access point (AP), wherein the another wireless communication device includes a wireless station (STA).

6. A wireless communication device comprising:
a communication interface; and
processing circuitry that is coupled to the communication interface, wherein at least one of the communication interface or the processing circuitry is configured to:
select a fast Fourier transform (FFT) structure from a plurality of FFT structures;
generate a plurality of orthogonal frequency division multiplexing (OFDM) symbols that includes data and pilots modulated on an occupied subset of a plurality of sub-carriers associated with the FFT structure; and
transmit the plurality of OFDM symbols to another wireless communication device to be used by the another wireless communication device to perform channel estimation of a wireless communication channel between the wireless communication device and the another wireless communication device, wherein the FFT structure is selected from:
a first FFT structure of the plurality of FFT structures specifies a first number of sub-carriers, a first occupied subset of sub-carriers within the first number of sub-carriers for the first FFT structure, and a first pilot periodicity of a first number of symbols associated with a first pilot pattern of the first FFT structure and the first FFT structure includes 6 pilots per OFDM symbols associated with the first pilot pattern;
a second FFT structure, larger than the first FFT structure, of the plurality of FFT structures, specifies a second number of the sub-carriers that is different than the first number of sub-carriers, a second occupied subset of sub-carriers within the second number of the sub-carriers for the second FFT structure, and a second pilot periodicity of a second number of symbols associated with a second pilot pattern for the respective FFT and the second FFT structure includes 8 pilots per OFDM symbols associated with the second pilot pattern; and
a third FFT structure, larger than the second FFT structure, of the plurality of FFT structures, specifies a same pilot periodicity of a number of symbols as the second FFT structure and the third FFT structure includes 16 pilots per OFDM symbols associated with the second pilot pattern.

7. A wireless communication device comprising:
a communication interface; and processing circuitry that is coupled to the communication interface, wherein at least one of the communication interface or the processing circuitry configured to:

select a fast Fourier transform (FFT) structure from a plurality of FFT structures;

generate a plurality of orthogonal frequency division multiplexing (OFDM symbols that includes data and pilots modulated on an occupied subset of a plurality of sub-carriers associated with the FFT structure; and transmit the plurality of OFDM symbols to another wireless communication device to be used by the another wireless communication device to perform channel estimation of a wireless communication channel between the wireless communication device and the another wireless communication device, wherein the FFT structure is selected from:

a first FFT structure, size 2n FFT, of the plurality of FFT structures specifies a first number of sub-carriers, a first occupied subset of sub-carriers within the first number of sub-carriers for the first FFT structure, and a first pilot periodicity of a first number of symbols associated with a first pilot pattern of the first FFT structure, wherein n is a non-zero integer;

a second FFT structure, size $2^{n-1}$ FFT, the plurality of FFT structures specifies a second number of sub-carriers that is different than the first number of sub-carriers, a second occupied subset of sub-carriers within the second number of sub-carriers for the second FFT structure, and a second pilot periodicity of a second number of symbols associated with a second pilot pattern for the respective FFT; and a third FFT structure, size $2^{n+2}$ FFT, specifies a same pilot periodicity and number of symbols as the second FFT structure.

8. The wireless communication device of claim 7, wherein n equals 7.

9. The wireless communication device of claim 8, wherein:

the first FFT structure includes the first pilot periodicity having 19 symbols associated with the first pilot pattern;

the second FFT structure includes the second pilot periodicity having 31 symbols associated with the second pilot pattern; and the third FFT structure includes a third pilot periodicity having 31 symbols associated with a third pilot pattern.

10. The wireless communication device of claim 7, the at least one of the communication interface or the processing circuitry is further configured to:

generate the plurality of OFDM symbols based on space time block coding (STBC).

11. The wireless communication device of claim 7 further comprising:

a wireless station (STA), wherein the another wireless communication device includes an access point (AP).

12. The wireless communication device of claim 7 further comprising:

an access point (AP), wherein the another wireless communication device includes a wireless station (STA).

13. A wireless communication device comprising:

a communication interface; and processing circuitry that is coupled to the communication interface, wherein at least one of the communication interface or the processing circuitry configured to:

select a fast Fourier transform (FFT) structure from a plurality of FFT structures;

generate a plurality of orthogonal frequency division multiplexing (OFDM) symbols that includes data and pilots modulated on an occupied subset of a plurality of sub-carriers associated with the FFT structure; and transmit the plurality of OFDM symbols to another wireless communication device to be used by the another wireless communication device to perform channel estimation of a wireless communication channel between the wireless communication device and the another wireless communication device, wherein the FFT structure is selected from:

a first FFT structure of the plurality of FFT structures specifies a first number of sub-carriers, a first occupied subset of sub-carriers within the first number of sub-carriers for the first FFT structure, and a first pilot periodicity of a first number of symbols associated with a first pilot pattern of the first FFT structure;

a second FFT structure of the plurality of FFT structures specifies a second number of sub-carriers that is different than the first number of sub-carriers, a second occupied subset of sub-carriers within the second number of sub-carriers for the second FFT structure, and a second pilot periodicity of a second number of symbols associated with a second pilot pattern for the respective FFT;

the plurality of FFT structures includes the first FFT structure, the second FFT structure, a third FFT structure, a fourth FFT structure, and a fifth FFT structure;

the first FFT structure is a $2^n$ FFT structure and has the first pilot periodicity of the first number of symbols, wherein n is a non-zero integer;

the second FFT structure is a $2^{n+1}$ FFT structure and has the second pilot periodicity of the second number of symbols;

the third FFT structure is a $2^{n+2}$ FFT structure and has a third pilot periodicity of a third number of symbols;

the fourth FFT structure is a $2^{n+3}$ FFT structure and has a fourth pilot periodicity of a fourth number of symbols; and the fifth FFT structure is a $2^{n+4}$ FFT structure and has a same pilot periodicity and number of symbols as the fourth FFT structure.

14. The wireless communication device of claim 13, wherein n equals 5.

15. The wireless communication device of claim 13, wherein:

the first FFT structure includes the first pilot periodicity having 13 symbols associated with the first pilot pattern;

the second FFT structure includes the first pilot periodicity having 14 symbols associated with the first pilot pattern;

the third FFT structure includes the first pilot periodicity having 19 symbols associated with the first pilot pattern;

the fourth FFT structure includes a fourth pilot periodicity having 31 symbols associated with the second pilot pattern; and the fifth FFT structure includes a fifth pilot periodicity having 31 symbols associated with a third pilot pattern.

16. The wireless communication device of claim 13, wherein:

the first FFT structure includes 26 occupied tones;

the second FFT structure includes 56 occupied tones;

the third FFT structure includes 114 occupied tones;

the fourth FFT structure includes 242 occupied tones; and the fifth FFT structure includes 484 occupied tones.

17. The wireless communication device of claim 13 further comprising:
   generating the plurality of OFDM symbols based on space time block coding (STBC).

18. The wireless communication device of claim 13, wherein the wireless communication device includes a wireless station (STA), wherein the another wireless communication device includes an access point (AP).

19. The wireless communication device of claim 13 further comprising:
   an access point (AP), wherein the another wireless communication device includes a wireless station (STA).

* * * * *